(12) United States Patent
Kobayashi

(10) Patent No.: US 11,780,052 B2
(45) Date of Patent: Oct. 10, 2023

(54) SHOT PEENING METHOD

(71) Applicant: SINTOKOGIO, LTD., Nagoya (JP)

(72) Inventor: Yuji Kobayashi, Nagoya (JP)

(73) Assignee: SINTOKOGIO, LTD., Nagoya (JP)

( * ) Notice: Subject to any disclaimer, the term of this patent is extended or adjusted under 35 U.S.C. 154(b) by 0 days.

(21) Appl. No.: 17/682,533

(22) Filed: Feb. 28, 2022

(65) Prior Publication Data

US 2022/0281071 A1 Sep. 8, 2022

(30) Foreign Application Priority Data

Mar. 2, 2021 (JP) .................................. 2021-032347

(51) Int. Cl.
*B24C 1/10* (2006.01)
*C21D 7/06* (2006.01)
*B24C 11/00* (2006.01)

(52) U.S. Cl.
CPC .............. *B24C 1/10* (2013.01); *B24C 11/00* (2013.01); *C21D 7/06* (2013.01); *Y10T 29/479* (2015.01)

(58) Field of Classification Search
CPC ............ B24C 1/10; C21D 7/06; Y10T 29/479
See application file for complete search history.

(56) References Cited

U.S. PATENT DOCUMENTS

| 7,703,312 B2 * | 4/2010 | David | F01D 5/3007 |
| | | | 451/39 |
| 9,457,451 B2 * | 10/2016 | Tawa | B24C 1/10 |
| 2011/0162751 A1 * | 7/2011 | Fitzgerald | C23C 30/00 |
| | | | 977/734 |
| 2019/0126706 A1 * | 5/2019 | Tange | F16F 1/04 |

FOREIGN PATENT DOCUMENTS

| CN | 112011674 A | * 12/2020 |
| JP | 2011-235318 A | 11/2011 |

OTHER PUBLICATIONS

Ervin Cut-Wire Shot (published Jan. 15, 2018) https://www.ervinindustries.com/products/ervin-cut-wire-shot (Year: 2018).*

* cited by examiner

*Primary Examiner* — Sarang Afzali
(74) *Attorney, Agent, or Firm* — Faegre Drinker Biddle & Reath LLP

(57) ABSTRACT

A shot peening method is disclosed. One method includes performing a first shot peening for applying residual stress to a surface of an object formed of a metal material at a first depth, and performing a second shot peening for applying residual stress to the surface of the object at a second depth deeper than the first depth after the first shot peening. The first shot peening is performed before the object is used at a high temperature and the second shot peening is performed after the object is used at the high temperature, and after a cracking caused by stress due to thermal expansion and contraction of crystal grains occurs in the object. The cracking being deeper than the first depth and shallower than the second depth.

12 Claims, 2 Drawing Sheets

SHOT PEENING METHOD

TECHNICAL FIELD

The present disclosure relates to a shot peening method.

This application is based upon and claims the benefit of priority from Japanese Patent Application No. 2021-032347, filed on Mar. 2, 2021, the entire content of which is incorporated in this specification by reference.

BACKGROUND

Shot peening in which shot media (shots) having a high hardness are projected onto a surface of an object formed of a metal material is known (for example, Japanese Unexamined Patent Publication No. 2011-235318). Shot peening is effective in lengthening a life of a product formed of a metal material. For example, breakage of a die-casting die is often caused by heat check (heat cracking) occurring due to repeated thermal expansion and thermal contraction. According to shot peening, residual stress (compressive residual stress) can be applied to a surface of a die, and occurrence of heat check can be curbed. If the life of a die is lengthened by means of shot peening, die costs included in manufacturing costs of a product can be reduced.

SUMMARY

The present disclosure provides a shot peening method in which a life of an object formed of a metal material can be further lengthened.

A shot peening method according to an aspect of the present disclosure includes performing first shot peening for applying residual stress to a surface of an object formed of a metal material at a first depth, and performing second shot peening for applying residual stress to the surface of the object at a second depth deeper than the first depth after the first shot peening.

In the shot peening method, since residual stress is applied to the surface of the object through the first shot peening, an effect of curbing heat check can be achieved. Even if an effect of the first shot peening is reduced while the object is in use, since residual stress is applied to the surface of the object through the second shot peening, the effect of curbing heat check can be achieved again. Particularly, residual stress is applied at the first depth in the first shot peening. In contrast, residual stress is applied at the second depth deeper than the first depth in the second shot peening. Therefore, further progress of cracking which has progressed deeper than the first depth can be curbed. From the above, the life of an object formed of a metal material can be further lengthened.

In the shot peening method according to the aspect, a particle size of shot media in the second shot peening may be larger than a particle size of shot media in the first shot peening. In addition, a projection speed of shot media in the second shot peening may be higher than a projection speed of shot media in the first shot peening. In addition, a hardness of shot media in the second shot peening may be harder than a hardness of shot media in the first shot peening. In these cases, the second depth can be easily made deeper than the first depth.

In the shot peening method according to the aspect, the object may be formed of an iron-based alloy or a titanium-based alloy. Since the iron-based alloy and the titanium alloy are widely used, it is highly necessary to provide a shot peening method in which a life can be further lengthened.

In the shot peening method according to the aspect, the object may be a die-casting die or a transmission gear. Since the die-casting die is used at a high temperature, an effect of curbing heat check is likely to be reduced. The transmission gear is a component to which a considerable load is applied. In addition, particularly, when the transmission gear is used in construction machinery, since it is heavy machinery having a high operation rate, it is difficult to perform replacement. Thus, in the die-casting die and the transmission gear, it is highly necessary to provide a shot peening method in which a life can be further lengthened.

DETAILED DESCRIPTION

Figure 1:
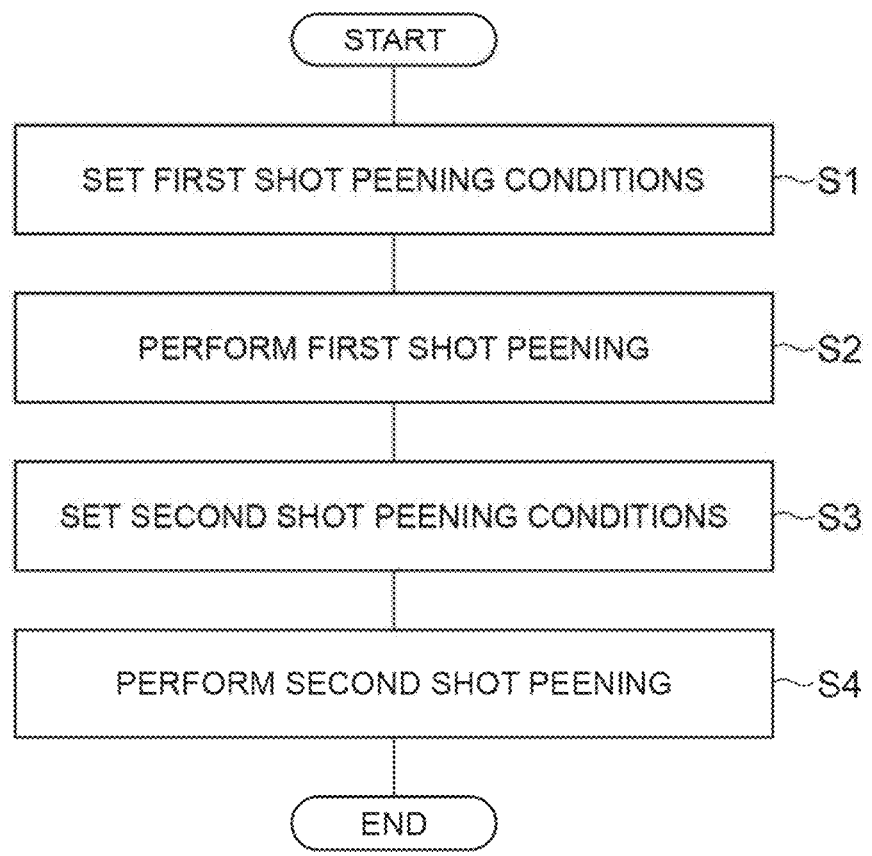
FIG. 1 is a flowchart showing a shot peening method according to an embodiment.

Hereinafter, with reference to the accompanying drawings, an embodiment will be described in detail. In the description, the same reference signs are used for the same elements or elements having the same function, and duplicate description thereof will be omitted.

A shot peening method according to the embodiment is a method of performing shot peening for an object formed of a metal material. For example, the object is formed of an iron-based alloy or a titanium-based alloy. For example, an iron-based alloy is a steel material. Specifically, steel materials include medium carbon quenched materials having a carbon content of 0.5% to 0.6%, high carbon carburized materials having a carbon content of 0.8% to 1.1%, and the like. For example, a quenching material of medium carbon is used as a spring material, and a die material for aluminum die-casting. For example, a carburizing material of high carbon is used as a gear material. All of these steel materials are martensite steels having a martensite structure.

For example, a titanium-based alloy is an α titanium alloy (for example, Ti-5Al-1Mo-1V), an α-β titanium alloy (for example, Ti-6Al-4V), or a β titanium alloy (for example, Ti-14-3-3-3). Among titanium-based alloys, Ti-6Al-4V that is an α-β titanium alloy (so-called 64 titanium) is most frequently used. It is used for implants including artificial articulations, frame members of aircraft, or the like.

For example, the object is a die-casting die or a transmission gear. A typical material of a die-casting die is SKD 61 (JIS standard). SKD 61 of the JIS standard corresponds to X40CrMoV5-1 of the ISO standard (ISO 4957:1999). In a die-casting die, generally, nitriding is applied after quenching and tempering. Examples of a type of nitriding include salt-bath soft nitriding, gas nitriding, and plasma nitriding. Among these, salt-bath soft nitriding is often used due to low costs and because it can also be applied to a large object. Salt-bath soft nitriding is a process in which a compound layer is generated on a surface of a steel and then nitrogen diffuses thereinto, and a compound layer is always present on the surface. In this compound layer, there is action of curbing adhesion of iron and aluminum. There is no distinct boundary between the steel (parent phase) and the compound layer, and the composition (chemical components) continuously changes from the parent phase and forms a compound layer. Although the compound layer is hard, it also has brittle and fragile properties, and it is said that cracking is also caused at crystal grain boundaries of the steel (parent phase).

Description will be further continued with a case of an aluminum alloy die-casting die as an example. Approximately 70% of breakage of an aluminum alloy die-casting die is caused due to occurrence of cracking, which is so-called heat check. Expansion and contraction of crystal grains occur due to a heat cycle which the die is subjected to from a high-temperature molten aluminum bath and a low-temperature die release agent. As a result, heat check occurs from a crystal grain boundary. Some documents say that it is effective to apply residual stress through shot peening in order to curb heat check. Here, a method of using X-rays is used for evaluation of residual stress. Heat check is cracking having a crystal grain boundary as a starting point. In contrast, residual stress inside crystal grains is evaluated with X-rays. It is uncertain how residual stress inside crystal grains contributes to curbing heat check. However, as a result, it is considered that occurrence of heat check can be curbed through shot peening, in fact.

The temperature of the die-casting die is around 550 degrees at all times due to heat received from the molten aluminum bath. This temperature is substantially the same as the temperature of recrystallization of steel. For instance, even if residual stress is applied through shot peening, stress is released within this temperature range. Therefore, it is somewhat unreasonable to consider that residual stress through shot peening is the only reason for curbing heat check.

Shot peening is processing for causing plastic deformation. According to shot peening, refinement of crystal grains occurs as a result. Heat check occurs from a crystal grain boundary. Thus, refinement of crystal grains and complexity of a path are considered to be effective in the sense of loss of opportunity for occurrence of heat check. Refinement of crystal grains does not appear in numerical values as measurement results of residual stress using X-rays. Regarding numerical values obtained from X-ray stress measurement, a half width is a parameter indicating crystallinity. A larger numerical value of the half width indicates that crystal grains are more refined and complicated.

As described above, the die-casting die is exposed to the temperature of recrystallization of steel at all times. Even if refinement of crystal grains has occurred through shot peening, recrystallization of crystal grains progresses while the die-casting die is in use, and thus the effect of shot peening is reduced. As a matter of course, it is effective to perform shot peening at an initial stage in order to extend the life of the die-casting die. However, the effect of shot peening is gradually reduced. Thus, if crystal grains are refined by performing shot peening again while being in use, the die-casting die can be expected to have a further lengthened life. Here, such shot peening will be referred to as repetition shot peening.

FIG. 1 is a flowchart showing a shot peening method according to the embodiment. As illustrated in FIG. 1, the shot peening method according to the embodiment includes Step S1 of setting first shot peening conditions for first shot peening, Step S2 of performing the first shot peening, Step S3 of setting second shot peening conditions for second shot peening, and Step S4 of performing the second shot peening. The second shot peening corresponds to the repetition shot peening. For example, Step S1 and Step S2 are performed at the time of manufacturing the object. For example, Step S3 and Step S4 are performed at the time of maintenance of the object. Hereinafter, each of the steps will be described.

In Step S1, as the first shot peening conditions, conditions for applying the maximum residual stress to the object are set. The maximum residual stress indicates the largest value for compressive residual stress which can be applied to the object. The maximum residual stress varies depending on the object. For example, the first shot peening conditions set in Step S1 are a hardness of shot media, a particle size of shot media, a projection speed of shot media, and the like.

Since heat check is caused by stress due to thermal expansion and contraction of crystal, only a surface having the largest stress becomes a starting point of breakdown. Shot peening is inherently processing for applying stress to a surface. Therefore, in the first shot peening performed with respect to a newly manufactured object, suitable first shot peening conditions corresponding to the hardness or the like of the object are set.

In shot peening, residual stress applied to the object can be increased by increasing the hardness of shot media. However, when the hardness of the object does not match the hardness of shot media, residual stress applied to the object may be contrarily reduced by enhancing the hardness of shot media. Namely, in order to apply the maximum residual stress to the object, there is a need to optimize a balance between the hardness of the object and the hardness of shot media.

For example, in order to apply the maximum residual stress to the object through the first shot peening, the hardness of shot media is set higher than the hardness of the object within a range of 50 HV (Vickers hardness) to 250 HV. Residual stress can be applied to a surface part of the object by causing the difference therebetween to be 50 HV or higher. If it is set higher than 250 HV, energy of projection is used for erosion of a surface of the object. Therefore, residual stress cannot be effectively and stably applied to a surface part of the object. If the amount of erosion increases, the amount of change in dimensions of the object also increases. Residual stress can be effectively and stably applied to a surface part of the object by causing the amount of erosion of the object to be 5 μm or smaller. In addition, change in dimensions of the object can be curbed. Further, deterioration in surface roughness of the object can be curbed.

However, if the hardness of the object is lower than 750 HV, sufficient residual stress may not be able to be applied to a surface part of the object. For example, the hardness of the object means a hardness of the object from a surface thereof to a surface part at a depth of 0.050 mm.

Similar to the case of the hardness, residual stress applied to the object can be increased by increasing the particle size of shot media. As the particle size of shot media increases, a peening influence layer is formed deeper. However, if the particle size of shot media is excessively large, residual stress applied to the object may be contrarily reduced. There is also concern that damage to the object may increase so that embrittlement of the material itself, deterioration in surface roughness of the object, or change in dimensions may occur. For example, surface roughness depends on the particle size of shot media. In addition, if the particle size of shot media is excessively large, there is also concern that processing may not be able to be performed in accordance with the capacity of projection facility. Further, since the number of shots per unit flow rate is reduced, a processing time is lengthened.

For example, when shot media have a spherical shape, the particle size of the shot media is the diameter of the shot media. In order to apply the maximum residual stress to the object through the first shot peening, the particle size of shot media is 50 μm to 1,000 μm, for example. A part immediately below a surface of the object can be reformed by causing the particle size of shot media to be 50 μm or larger. Although it also depends on the hardness or the purpose of the object, deterioration in surface roughness can be curbed by causing the particle size of shot media to be 1,000 μm or smaller (1 mm or smaller). The depth (thickness) of a peening influence layer obtained by setting the particle size of shot media to 1,000 μm is approximately 500 μm. Since surface roughness deteriorates, it is difficult to have a peening influence layer thicker than this.

Similar to the case of the hardness, residual stress applied to the object can be increased by increasing the projection speed of shot media. However, if the projection speed of shot media is excessively high, residual stress applied to the object may be contrarily reduced. There is also concern that embrittlement of the material itself, deterioration in surface roughness of the object, or change in dimensions may occur. In order to apply the maximum residual stress to the object through the first shot peening, the projection speed of shot media is 50 m/s to 150 m/s, for example. When an air peening apparatus using a nozzle is used, the foregoing projection speed can be realized by causing the projection pressure (air pressure) to be 0.05 MPa to 0.5 MPa, for example.

Figure 2A:
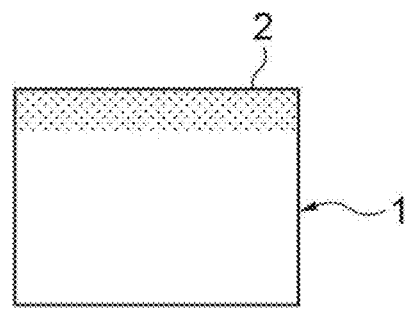
FIG. 2A, FIG. 2B, FIG. 2C, and FIG. 2D is explanatory schematic cross-sectional views of an influence layer and heat check in an object.

In Step S2, the first shot peening is performed with respect to the object under the first shot peening conditions set in Step S1. Accordingly, as illustrated in FIG. 2A, a peening influence layer 3 is formed on a surface 2 of the object 1. Distortion has been introduced to the peening influence layer 3 through the first shot peening, and residual stress has been applied thereto. That is, the first shot peening is processing in which distortion is introduced to the surface 2 of the object 1 at a first depth d1 equivalent to the thickness of the peening influence layer 3 and residual stress is applied thereto. In the peening influence layer 3, crystal grains are refined, and crystal grain boundaries are complicated. The peening influence layer 3 is a distortion introduction layer having distortion introduced thereto and is a residual stress application layer having residual stress applied thereto.

Figure 2B:
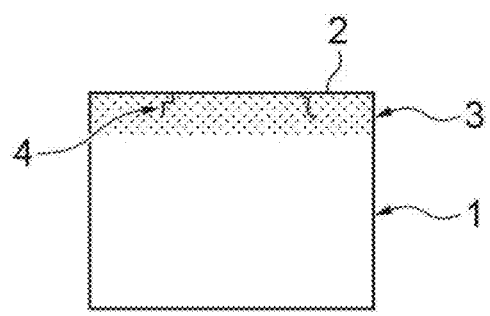
Figure 2C:
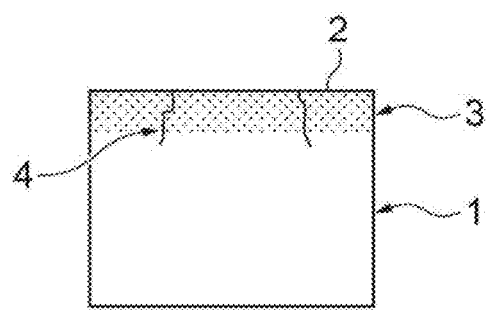

When the object 1 after Step S2 is used to some extent, as illustrated in FIG. 2B, heat check 4 occurs on the surface 2 of the object 1 and proceeds toward the inside of the object 1. As described above, since the usage environment of a die-casting die is in a temperature range in which recrystallization occurs, crystal grains gradually recover from the influence of the first shot peening. Namely, the effects of refinement of crystal grains and introduction of distortion in the object 1 are gradually reduced. In this process, the heat check 4 also progresses. As illustrated in FIG. 2C, the heat check 4 eventually progresses beyond the peening influence layer 3.

In Step S3, the second shot peening conditions for the second shot peening are set. For example, the second shot peening conditions are a hardness of shot media, a particle size of shot media, a projection speed of shot media, and the like. The second shot peening is performed with respect to the object 1 in a state in which the heat check 4 has progressed. In order to achieve a further extended life of the object 1, there is a need to form the peening influence layer 3 at a position deeper than the heat check 4. That is, the second shot peening conditions are set such that the peening influence layer 3 is formed deeper than that under the first shot peening conditions.

For example, the particle size of shot media in the second shot peening is set such that it becomes larger than the particle size of shot media under the first shot peening conditions. The projection speed of shot media in the second shot peening is set such that it becomes larger than the projection speed of shot media in the first shot peening. The hardness of shot media in the second shot peening is set such that it becomes harder than the hardness of shot media in the first shot peening. In Step S3, at least one step of such setting need only be performed. For example, if the particle size of shot media in the second shot peening is set such that it becomes larger than the particle size of shot media in the first shot peening conditions, the projection speed and the hardness of shot media in the second shot peening may be the same as the projection speed and the hardness of shot media in the first shot peening.

Figure 2D:
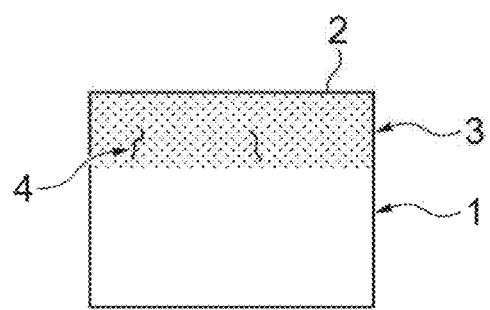

In Step S4, the second shot peening is performed with respect to the object 1 after Step S2 under the second shot peening conditions set in Step S3. Accordingly, as illustrated in FIG. 2D, residual stress is applied to the surface 2 of the object 1 at a second depth d2 deeper than the first depth d1, and the peening influence layer 3 having a thickness equivalent to the second depth d2 is formed. In the second shot peening, a plastic flow is caused due to collision of shot media, thereby resulting in action of closing the heat check 4 which has already occurred. Since this action is weak inside the object 1, the entire heat check 4 is not improved, and thus a part thereof may remain. However, the heat check 4 occurs from the outermost surface of the object 1, action on the outermost surface is important.

As described above, the shot peening method according to the embodiment includes Step S2 of performing the first shot peening of applying residual stress to the surface 2 of the object 1 formed of a metal material at the first depth d1, and Step S4 of performing the second shot peening of applying residual stress to the surface 2 of the object 1 at the second depth d2 deeper than the first depth d1 after the first shot peening.

In this shot peening method, since residual stress is applied to the surface 2 of the object 1 through the first shot peening, an effect of curbing the heat check 4 can be achieved. Even if an effect of the first shot peening is reduced while the object 1 is in use, since residual stress is applied to the surface 2 of the object 1 through the second shot peening, the effect of curbing the heat check 4 can be achieved again. Particularly, residual stress is applied at the first depth d1 in the first shot peening. In contrast, residual stress is applied at the second depth d2 deeper than the first depth d1 in the second shot peening. Therefore, further progress of cracking which has progressed deeper than the first depth d1 can be curbed. From the above, the life of the object 1 formed of a metal material can be further lengthened.

The particle size of shot media in the second shot peening may be larger than the particle size of shot media in the first shot peening. In addition, the projection speed of shot media in the second shot peening may be higher than the projection speed of shot media in the first shot peening. In addition, the hardness of shot media in the second shot peening may be harder than the hardness of shot media in the first shot peening. Accordingly, the second depth d2 can be easily made deeper than the first depth d1. That is, the peening influence layer 3 formed through the second shot peening can be easily made thicker than the peening influence layer 3 formed through the first shot peening.

The object 1 is an iron-based alloy or a titanium-based alloy. Since an iron-based alloy and a titanium alloy are widely used, it is highly necessary to provide a shot peening method in which a life can be further lengthened.

The object 1 is a die-casting die. Since a die-casting die is used at a high temperature, an effect of curbing heat check is likely to be reduced. Thus, in a die-casting die, it is highly necessary to provide a shot peening method in which a life can be further lengthened. In addition, the object 1 is a transmission gear. A transmission gear is a component to which a load is considerably applied. Particularly, when a transmission gear is used in construction machinery, since it is heavy machinery having a high operation rate, it is difficult to perform replacement. Thus, in a transmission gear, it is highly necessary to provide a shot peening method in which a life can be further lengthened.

The present invention is not necessarily limited to the embodiment described above, and various changes can be made within a range not departing from the gist thereof.

The shot peening method may further include a step of performing repetition shot peening after Step S4. When the object 1 after Step S4 is used, new heat check 4 occurs again from the surface 2 and proceeds toward the inside of the object 1. The new heat check 4 may join the heat check 4 remaining inside and progress. Therefore, when the repetition shot peening is performed after Step S4, there is a need to apply residual stress at a depth deeper than the depth at which residual stress has been applied in shot peening performed immediately before. Therefore, when the repetition shot peening is successively performed, the particle size of shot media is successively increased, for example.

What is claimed is:

1. A shot peening method, the method comprising:
   performing a first shot peening for applying residual stress to a surface of an object formed of a metal material at a first depth; and
   performing a second shot peening for applying residual stress to the surface of the object at a second depth deeper than the first depth after the first shot peening,
   wherein the first shot peening is performed before the object is used at a high temperature and the second shot peening is performed after the object is used at the high temperature, and after a cracking caused by stress due to thermal expansion and contraction of crystal grains occurs in the object, and
   wherein the cracking being deeper than the first depth and shallower than the second depth.

2. The shot peening method according to claim 1, wherein a particle size of shot media in the second shot peening is larger than a particle size of shot media in the first shot peening.

3. The shot peening method according to claim 1, wherein a projection speed of shot media in the second shot peening is higher than a projection speed of shot media in the first shot peening.

4. The shot peening method according to claim 1, wherein a hardness of shot media in the second shot peening is harder than a hardness of shot media in the first shot peening.

5. The shot peening method according to claim 1, wherein the object is formed of an iron-based alloy.

6. The shot peening method according to claim 1, wherein the object is formed of a titanium-based alloy.

7. The shot peening method according to claim 1, wherein the object is a die-casting die.

8. The shot peening method according to claim 1, wherein the object is a transmission gear.

9. The shot peening method according to claim 1, wherein the object is formed of a steel material.

10. The shot peening method according to claim 1, wherein a hardness of shot media in the first shot peening is higher than a hardness of the object within a range of 50 HV to 250 HV.

11. The shot peening method according to claim 1, wherein a particle size of shot media in the first shot peening is 50 µm to 1,000 µm.

12. The shot peening method according to claim 1, wherein a projection speed of shot media in the first shot peening is 50 m/s to 150 m/s.

* * * * *